United States Patent [19]

Shimomura et al.

[11] Patent Number: 5,195,671
[45] Date of Patent: Mar. 23, 1993

[54] STAPLER

[75] Inventors: Shigehiko Shimomura, Yawata; Tadayuki Haruyama, Katano; Yasuzo Hatazaki, Osaka; Shuichi Yasunaga, Katano; Yuji Wada, Kadoma, all of Japan

[73] Assignee: Matsushita Electric Industrial Co., Ltd., Osaka, Japan

[21] Appl. No.: 612,769

[22] Filed: Nov. 14, 1990

[30] Foreign Application Priority Data

Nov. 17, 1989 [JP] Japan .................................. 1-300472
Dec. 20, 1989 [JP] Japan .................................. 1-330535
Dec. 20, 1989 [JP] Japan .................................. 1-330536

[51] Int. Cl.⁵ .............................................. B27F 7/36
[52] U.S. Cl. ........................................ 227/5; 227/6; 227/7; 227/120
[58] Field of Search ............... 227/110, 111, 120, 121, 227/124, 131, 129, 135, 5, 6, 7

[56] References Cited

U.S. PATENT DOCUMENTS

| 4,113,164 | 9/1978 | Muthenthaller | 227/124 |
| 4,199,095 | 4/1980 | Yamanoi | 227/120 |
| 4,421,264 | 12/1983 | Arter et al. | 227/2 |
| 4,720,033 | 1/1988 | Olesen | 227/131 |

FOREIGN PATENT DOCUMENTS

3514687 11/1986 Fed. Rep. of Germany.

*Primary Examiner*—Douglas D. Watts
*Assistant Examiner*—Allan M. Schrock
*Attorney, Agent, or Firm*—Panitch Schwarze Jacobs & Nadel

[57] ABSTRACT

A stapler comprising a striking block having a staple striking blade for striking staples on its end; a motor for causing reciprocating motion of the staple striking block over a range from the staple striking position to a stopping position apart from the staple; a switch that is provided at the location of movement of the striking block, and is turned on and off by the motion of the striking block; and a control circuit which reverses the driving direction of the driving means, moves the striking block to the stopping position, and turns off the switching means, in case the switching means is not turned off within a predetermined time after the switching means is turned on by the motion of the striking block.

8 Claims, 8 Drawing Sheets

STAPLER

BACKGROUND OF THE INVENTION

1. Field of the Invention

The present invention relates to a stapler which uses staples to bind the papers that are to be bound, and more particularly to a stapler which uses a drive means such as a motor.

2. Description of the Prior Art

In the past, staplers have been equipped with a striking block for driving the stable into the paper to be bound, where this striking block is moved up and down by a coupling rod which is connected to the driving means, such as a motor. With the descent of the striking block the staple penetrates the papers, and when it reaches the bottom dead point the bending of the staple is completed. Next, the striking block rises, and when it reaches the top dead point the rotation of the motor is stopped.

This type of stapler has a cylindrical cam attached to the lateral surface of the main frame and a micro-switch, or read switch, attached to the same surface, where intermittence of the electric current supplied to the drive source is performed by these switches. Further, a plurality of springs are attached to the outside of the main frame, and when the fulcrum shaft provided on the coupling rod receives an excessive load in the upward direction, it becomes possible for the fulcrum shaft to move upward in opposition to the downward pushing force of the springs. Further, the drive motor, gear train, drive gears, coupling rod, fulcrum shaft and striking block etc. are not attached to the main frame as a single unit, but rather the main frame is divided into a several parts. For this reason, the assembling operation for the stapler is inefficient, and there is also the problem of high cost due to the large number of parts.

Furthermore, the staple case which contains the staples is positioned so as to be received on one step portion formed on the staple case sidewall, or it is positioned by providing a positioning pin and hole near the fastening screw, for positioning the part intervals. Further, the tip of the striking blade, which actually strikes the binding staple and drives it into the papers, is formed with a flate surface. For this reason, there is the problem of the staple being dislocated from the staple striking blade, making it impossible to drive the staple in properly.

There is also the problem that in case the strike could not be completed during the operation of the striking block and it stopped halfway through, it was necessary to perform manual switching of the polarity of the electric current in order to raise the striking block and remove the material which is to be bound.

SUMMARY OF THE INVENTION

The stapler of this invention, which overcomes the above-mentioned and numerous other disadvantages and deficiencies of the prior art, comprises a striking block having a staple striking blade for striking staples on its end; a driving means for causing reciprocating motion of the staple striking block over a range from the staple striking position to a stopping position apart from the staple; a switching means that is provided at the location of movement of the striking block, and is turned on and off by the motion of the striking block; and a control means which reverses the driving direction of the driving means, moves the striking block to the stopping position, and turns off the switching means, in case the switching means is not turned off within a predetermined time after the switching means is turned on by the motion of the striking block.

In a preferred embodiment, the stapler further comprises a rib formed on the striking block as an integral part of the striking block, wherein the rib activates the switching means.

In a preferred embodiment, the stapler comprises a coupling rod, at one end of which is attached the striking block, and at the midsection of which is attached a fulcrum shaft; transmitting means which is connected to the other end of the coupling rod, and which transmits driving force from the driving means to the coupling rod; a fulcrum bearing which supports the fulcrum shaft; and a single coil spring which forces the fulcrum shaft in the direction of the fulcrum bearing; wherein the fulcrum shaft is able to move against the force of the coil spring in case a load is exerted on the fulcrum shaft by the striking operation of the striking block.

In a preferred embodiment, the stapler further comprises a single main frame to which the driving means, the transmitting means, the coupling rod and the fulcrum shaft are attached.

In a preferred embodiment, the rib has flexibility.

Alternatively, the stapler of the invention comprises a striking block which has a stapler striking blade for striking a staple; a guide rib provided at a prescribed interval from the staple striking blade; a staple case having a staple case head at one end, a staple case aperture provided near the staple case head, and a pair of staple case sidewalls each having two step portions; and a case having a pair of staple case insertion ribs which receive and guide the staple case; wherein each of the staple case insertion ribs guide the staple case and contact with one step portion on each staple case sidewall, the position of the staple case being prescribed, and when the striking blade strikes a staple, the striking position of the staple striking blade is prescribed by means of the guidance of the guiding rib by another step portion of each staple case sidewall.

In a preferred embodiment, the staple striking blade has a concave shaped transverse section.

Alternatively, the stapler of this invention comprises a striking block having a staple striking blade for striking staples on its end; a direct current motor for causing reciprocating motion of the staple striking blade over a range from the staple striking position to a stopping position apart from the staple; a switching means that is provided at the location of movement of the striking block, and is turned on and off by the motion of the striking block; and a control means which reverses the direction of rotation of the motor, moves the striking block to a position away from the staples, and turns off the switching means, in case the switching means is not turned off within a predetermined time after the switching means is turned on by the motion of the striking block.

In a preferred embodiment, the control means stops the rotation of the motor in case the striking block does not return to the position where the switching means is turned off, even though the direction of rotation of the motor has been reversed.

Thus, the invention described herein makes possible the objectives of (1) providing a stapler which is assembled on a single main frame so as to reduce the number of parts; (2) providing a stapler in which a staple can be properly driven into the papers to be bound; and (3) providing a stapler in which the striking block is raised automatically in cases where the strike cannot be completed during the operation of the striking block and it is stopped half way through the cycle.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
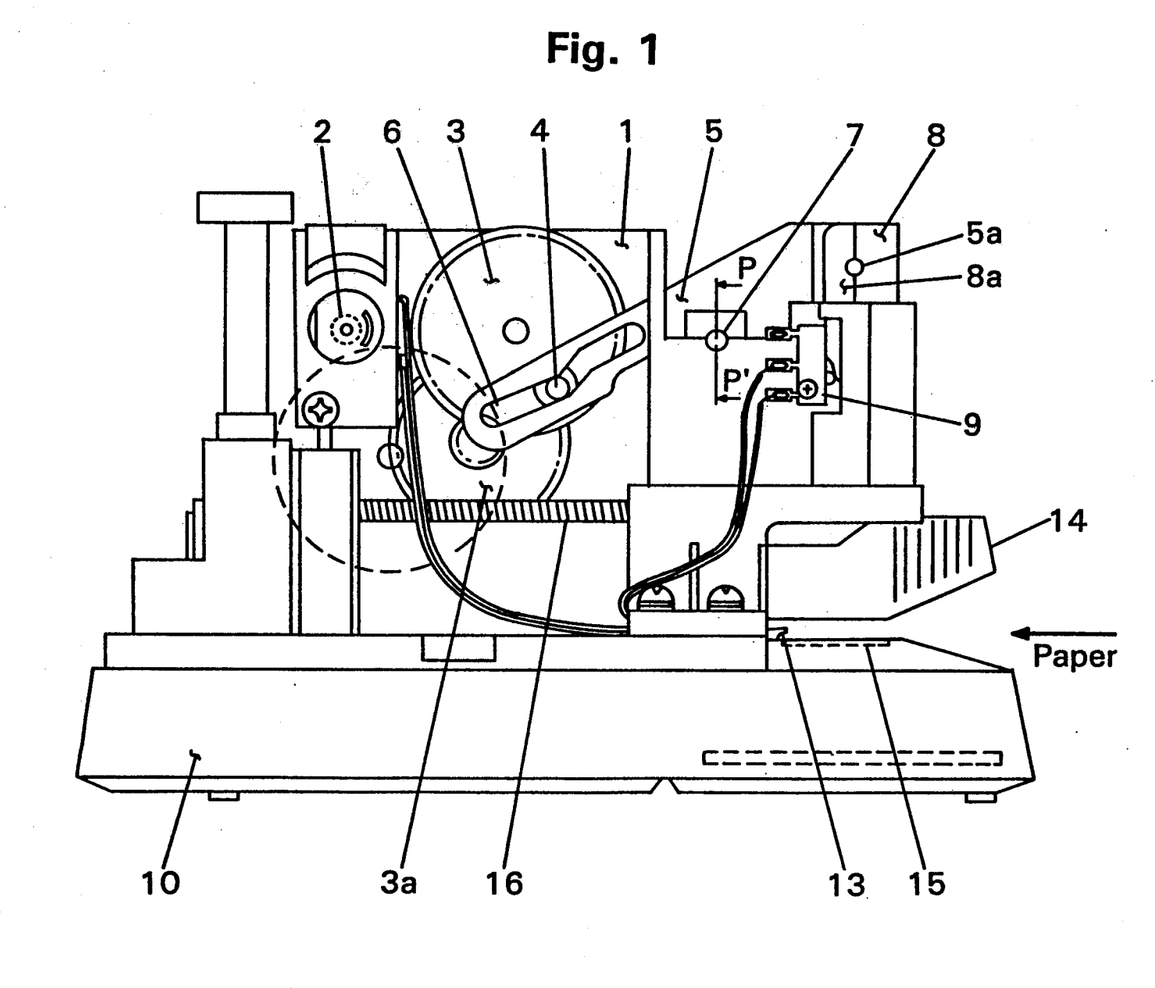
FIG. 1 is a front view showing the internal structure, with the cover removed, of a stapler in one embodiment of the invention.
Figure 2:
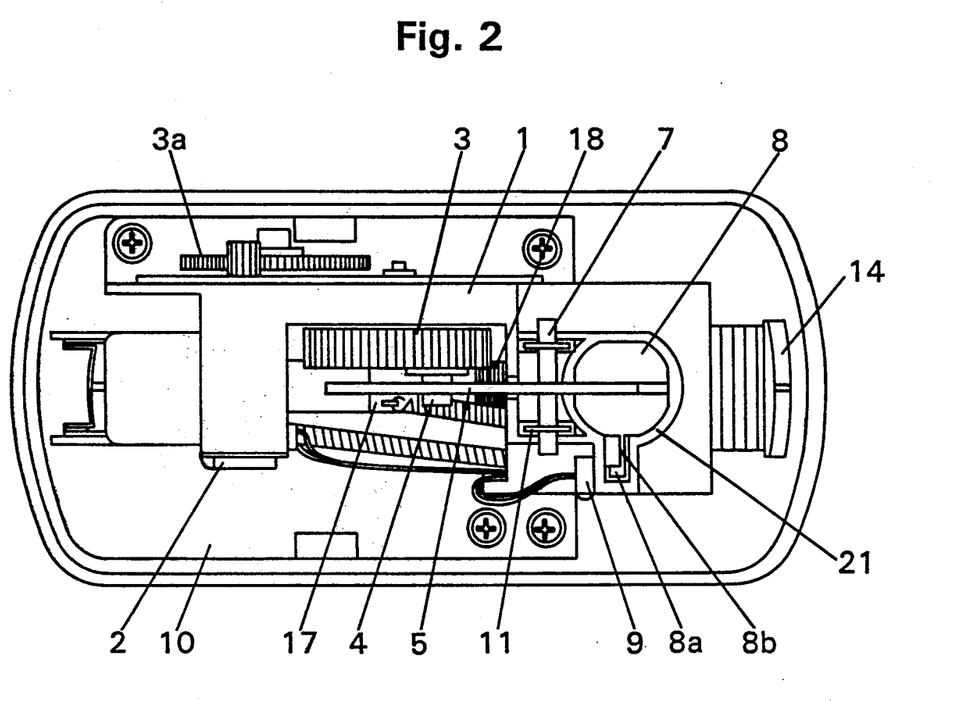
FIG. 2 is a top view of the stapler shown in FIG. 1.
Figure 3:
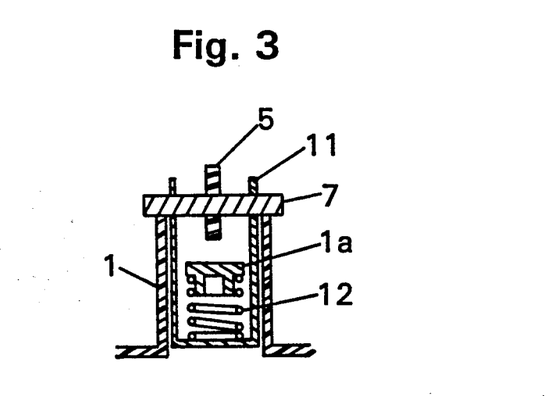
FIG. 3 is a cross-sectional view taken on the line P—P' of FIG. 1.
Figure 4:
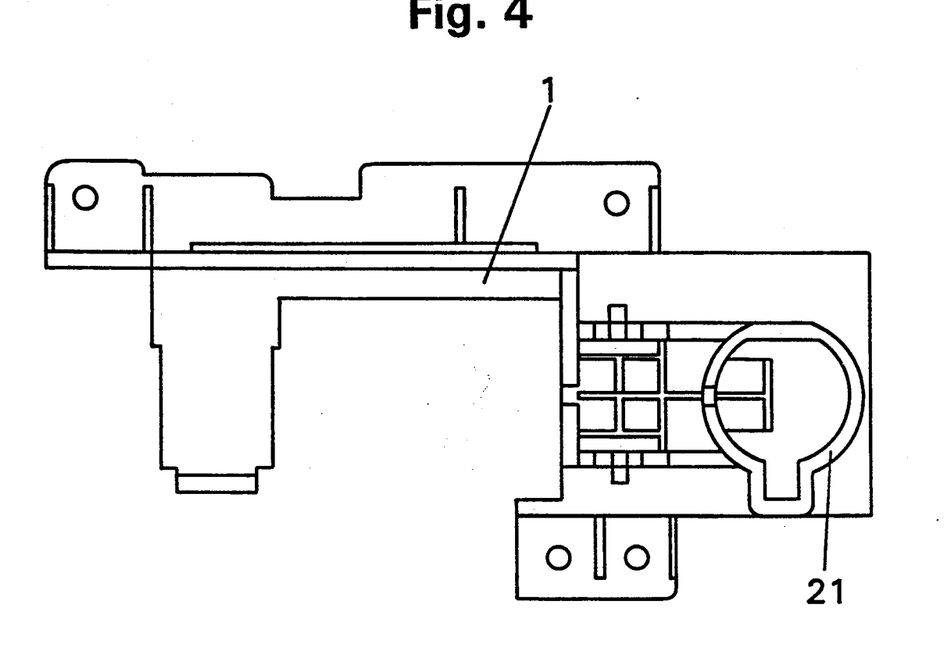
FIG. 4 is a top view of the main frame.
Figure 5:
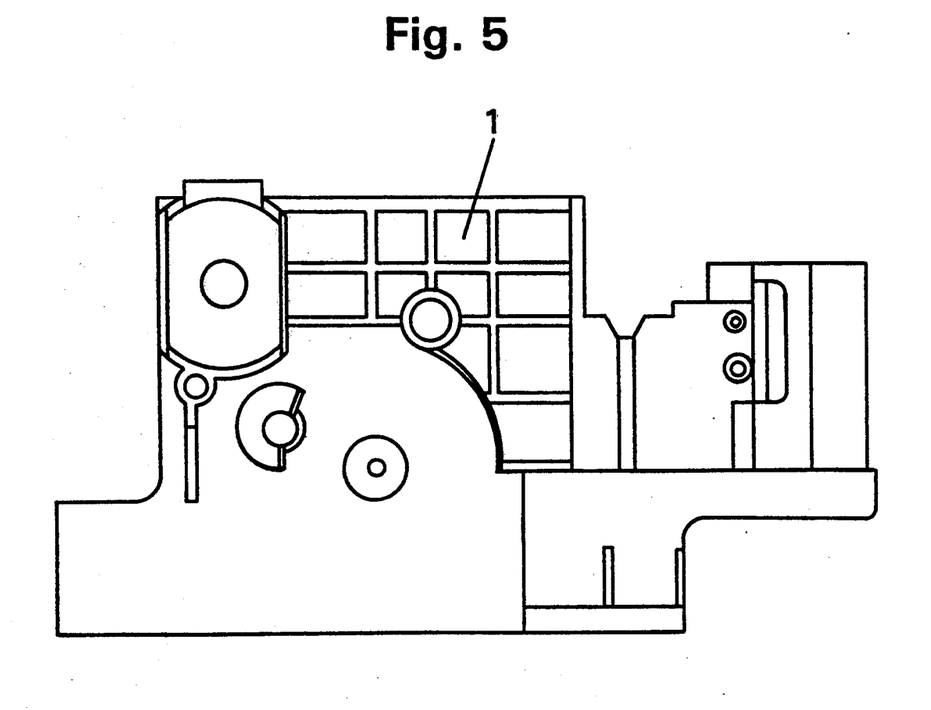
FIG. 5 is a front view of the main frame.
Figure 6:
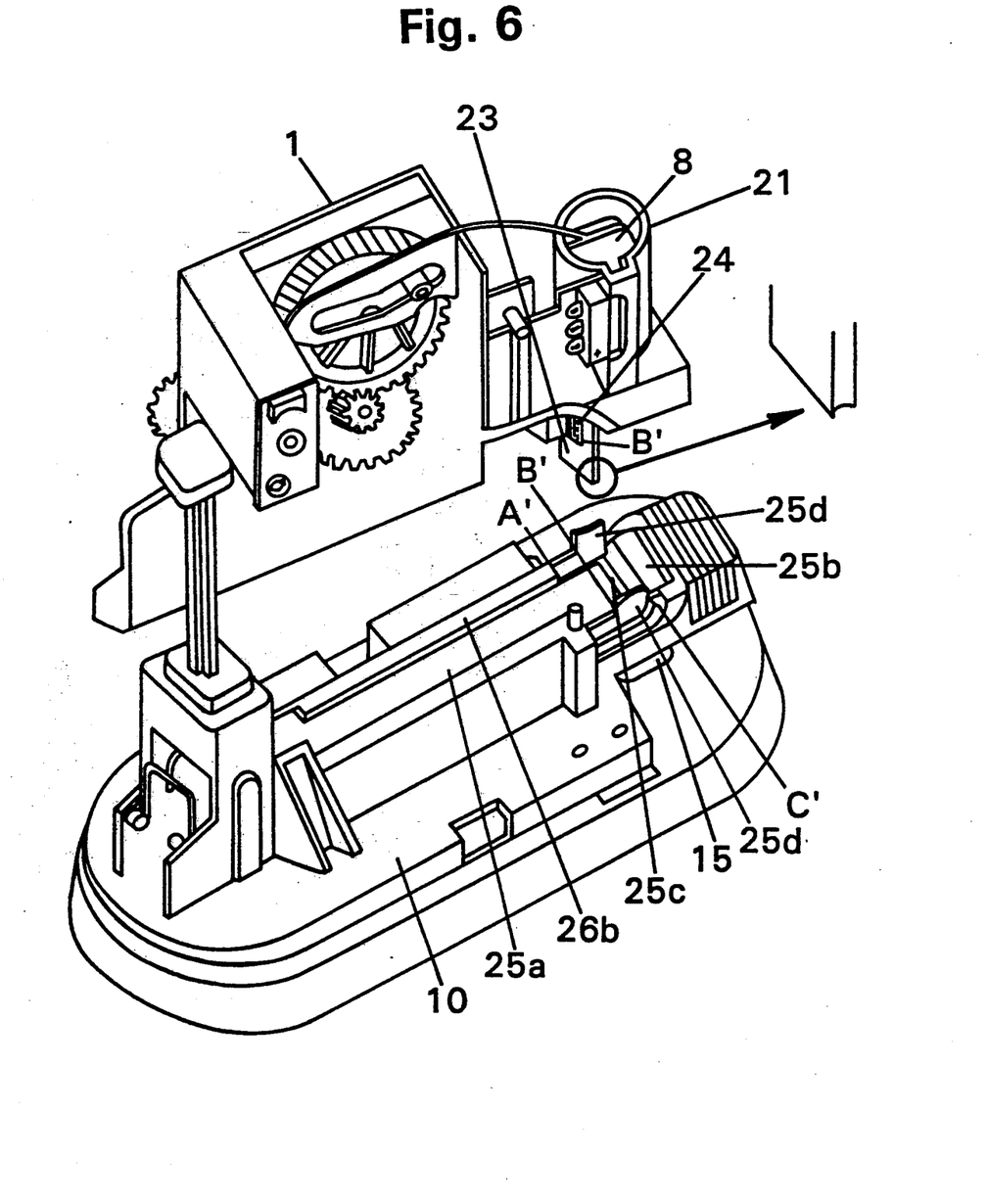
FIG. 6 is a view in perspective showing an another embodiment of the invention with the cover removed and the main frame and case detached.

An example of a stapler of the invention is explained below with reference to FIGS. 1 through 5. The stapler of this example, as shown in FIG. 1, has a main frame 1, a fixed member 1a which is formed as an integral part of this main frame 1 (FIG. 3), a motor 2, a driving gear 3, and a gear train 3a which connects this motor 2 and driving gear 3. A boss 4 is provided on the side surface of the driving gear 3, and this boss 4 is inserted into the slide slot 6 in a coupling rod 5, so that it is able to slide. The coupling rod 5 is attached to the main frame 1 by a fulcrum shaft 7. The fulcrum shaft 7 is attached to the main frame 1 through a small hole near the center of the coupling rod 5. The striking block 8 is attached to the end of the coupling rod 5 by the attachment hole 5a, and this striking block 8 undergoes a reciprocating motion up and down in the collar 21 of the main frame 1 (FIGS. 2 and 4).

The rib 8a and the thin wall portion 8b are provided on the side of the striking block 8 as an integral part of the striking block 8, and the micro-switch 9, as a switching means, is also attached to the main frame 1 near the striking block 8. Furthermore, the rib 8a is provided as an integral part of the thin wall portion 8b (FIG. 2), and this is given elasticity so that an excessive amount of pressure is not exerted on the switch button of the micro-switch 9. The micro-switch 9 is provided at the location where the rib 8a of the striking block 8 moves up and down. The main frame 1 is attached on top of the case 10 with screws. As shown in FIG. 3, the fulcrum shaft 7 is supported by the fulcrum bearings 11, and the spring 12 normally pulls the fulcrum shaft 7 downward. Numeral 13 is a switch for detecting the insertion of paper, and numeral 14 is the staple including case, numeral 15 is the staple bending plate which bends the ends of the staple after the paper is penetrated, and numeral 16 is the staple pushing spring which forces the staples toward the staple striking position. Thus, because all of the functional parts are attached as an integral part of the main frame 1, their assembly and replacement is also made easy.

Next, the operation will be explained. When the papers to be bound are inserted to the prescribed position in the stapler as shown by an arrow in FIG. 1, the switch 13 is activated, the motor 2 rotates and the driving gear 3 is rotated by way of the gear train 3a. When the driving gear 3 rotates, the boss 4 on its side surface moves around the circumference of the driving gear 3, and as a result the boss 4 of the driving gear 3 slides inside the slot 6, causing the coupling rod 5 to move up and down in a reciprocating motion with the fulcrum shaft 7 as its fulcrum. With relation to the fulcrum shaft 7, the motion of the striking block 8 is opposite to that of the side of the coupling rod 5 having the slot 6. In other words, when the side of the coupling rod 5 with the slot 6 rises, the side with the striking block 8 falls and acts to staple the papers. At this time, the rib 8a, which is provided as an integral part of the striking block 8, activates the switch 9.

Because the space between the lowest position of the tip of the staple striking blade, which is provided as an integral part of the striking block 8, and the staple bending plate 15, is adjusted to the thickness of the minimum number of sheets to be bound (2 sheets), it becomes impossible for the striking block 8 to drop to the lowest position when the number of sheets to be bound is increased. When this occurs the motor stops due to the excessive loading force exerted on the motor etc., or when the drive force of the motor 2 is great enough, it can break the driving gear 3 and the gear train 3a etc. The spring 12 shown in FIG. 3 is provided with the object of preventing this kind of malfunction, and as long as it is within the range of the maximum bindable number of sheets, the fulcrum shaft 7 rises against the elasticity of the spring 12, allowing the boss 4 to turn and making possible the continuation of normal operation.

Figure 12:
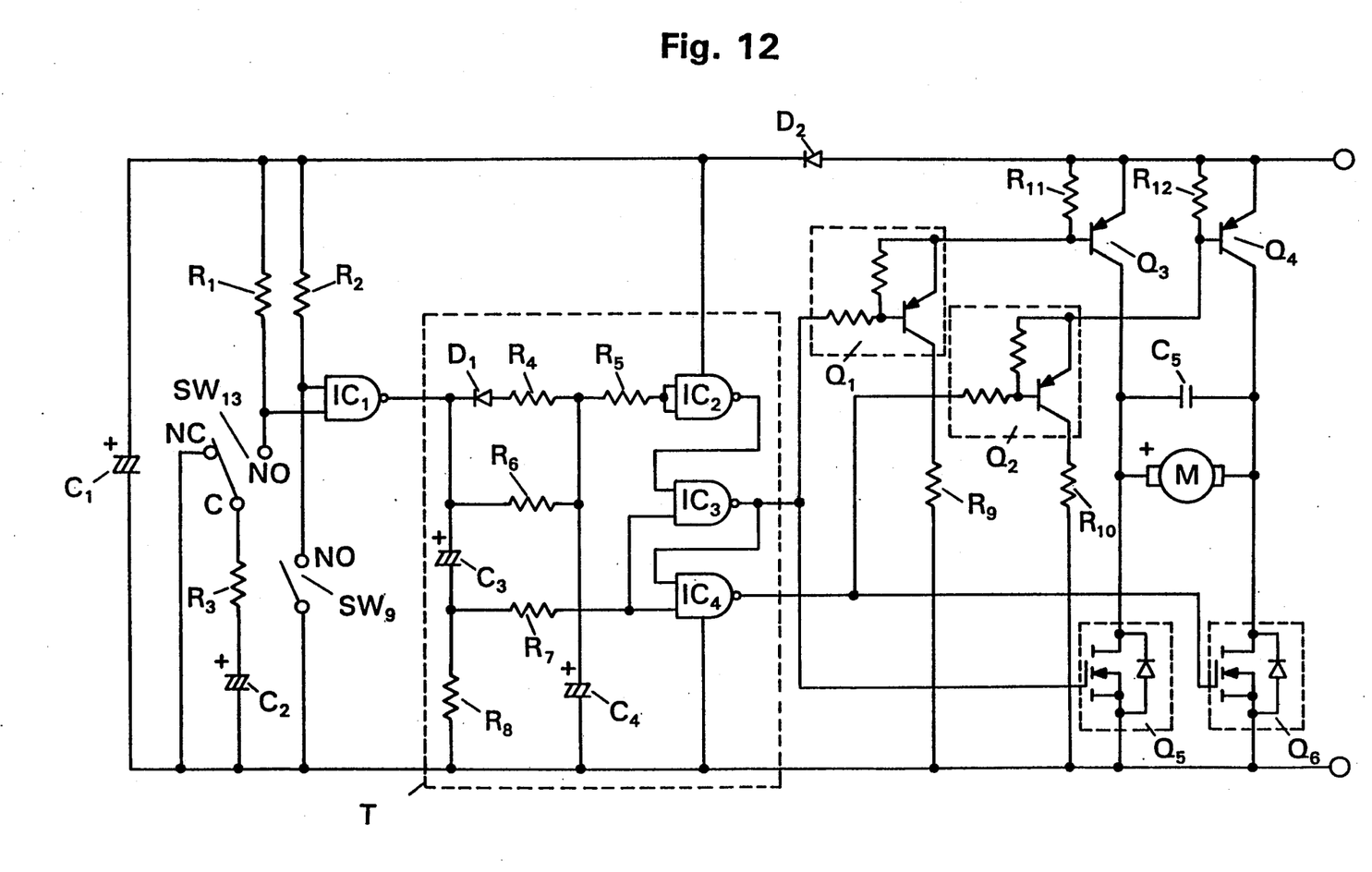
FIG. 12 is an electrical circuit diagram used for a stapler of the invention.

FIG. 12 is a circuit diagram used for this example, and its operation is explained below. SW13 is the paper detector switch, and prior to the insertion of paper the capacitor C2 is discharged. R3 is a protective resistor. When paper is inserted and SW13 turns on, C2 begins to charge through R1 and along with this an L (low) level signal is input to IC1. This time interval is determined by C2 and R1, and the initial driving signal of the motor is created. The initial driving signal passes through the timer control unit T, and rotates the motor by means of the driving transistors Q1, Q3 and Q6. By that means, the rib 8a, on the striking block 8 which has started to descend, activates the switch 9. Due to this, an L level signal is input to IC1, which results in the creation of a driving signal. The time interval for outputting the initial driving signal is established by C2 and R1 under the conditions mentioned below. The time interval setting is such that the initial drive signal rotates the motor 2 until the switch 9 is activated, and it is stopped at the time switch 9 is released by the striking block 8 that has risen after the striking of the staple has been completed. To say this in another way, from the time papers are inserted and SW13 is activated, until the time that the switch 9 is released, which was activated by the rib 8a of the striking block 8, the signal for driving the motor is output by IC1. In the case of normal operation, Q1, Q3 and Q6 are driven by the Low level signal output by IC3 and the High level signal output by IC4, thus causing normal rotation of the motor and thereby performing one binding operation.

Next, a case will be explained wherein the motor locks, the striking block does not rise and the switch 9 is not released, due to a load which is beyond the binding capability etc. When either one of SW9 or SW13 are on, C4 which is performing timer control, is charged through R6 by the High level output from IC1. In the case of normal operation, the electric potential of C4 will not reach the H level, because when a predetermined time passes switch 9 turns off. However, in the case of abnormal operation, switch 9 does not turn off even after the predetermined time passes, and the electric potential of C4 reaches the High level. Due to this, the output of IC2 changes from High to Low. The High level signal outputted by IC3 and the Low level signal outputted by IC4 drive Q2, Q4 and Q5, whereby the motor is reversed, raising the striking block 8, releasing the micro-switch 9, and completing the operation. This time interval until reverse rotation is determined by C4 and R6 is established to be sufficiently longer than the time interval for normal binding, so that a normal binding operation is completed before the time comes for reverse rotation.

In case by any chance the drive system or striking block are inoperative at this time, the motor lock condition is maintained, and when switch 9 is not released, the electric potential of the charged capacitor C3 goes from High to Low through R8 with the High level of IC1. With this, both IC3 and IC4 output High level signals, and the transistors Q1, Q2, Q3 and Q4 stop the electric current to the motor, and thus protection of the motor is accomplished. This time interval until the stopping of electric current is determined by C3 and R8, which is established to be sufficiently longer than the time interval for reverse rotation.

EXAMPLE 2

Another example of a stapler of the invention will be explained with reference to FIGS. 6 through 11. The stapler of this example also has a main frame 1, and a striking block 8 which is enclosed in a collar 21 of the main frame 1 such that it slides freely up and down in the collar 21. In the same way as in the above mentioned Example 1, the micro-switch 9 is provided at the location where the striking block 8 moves, as a switching means that is turned on and off by the reciprocal motion of the striking block 8.

Figure 10:
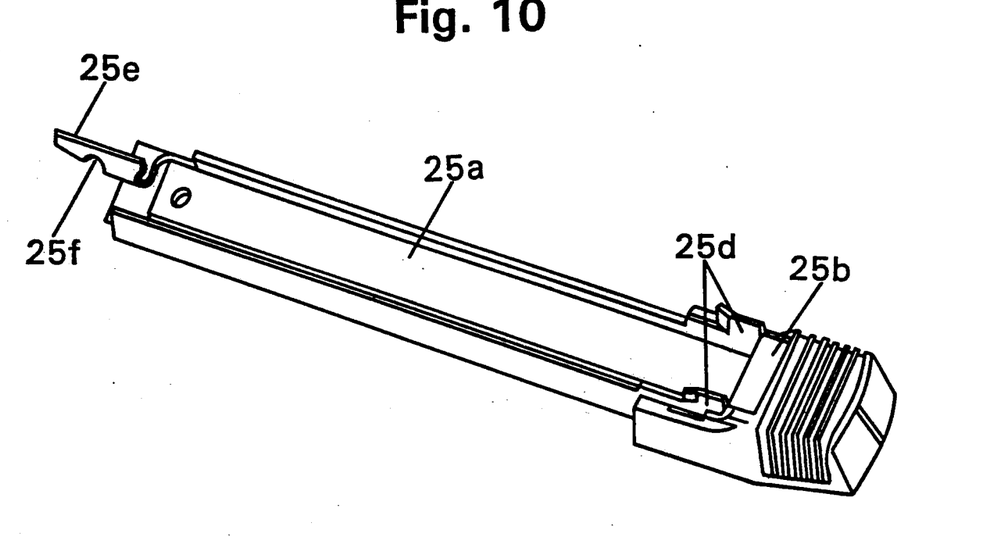
FIG. 10 is a view in perspective of the staple case section.
Figure 11:
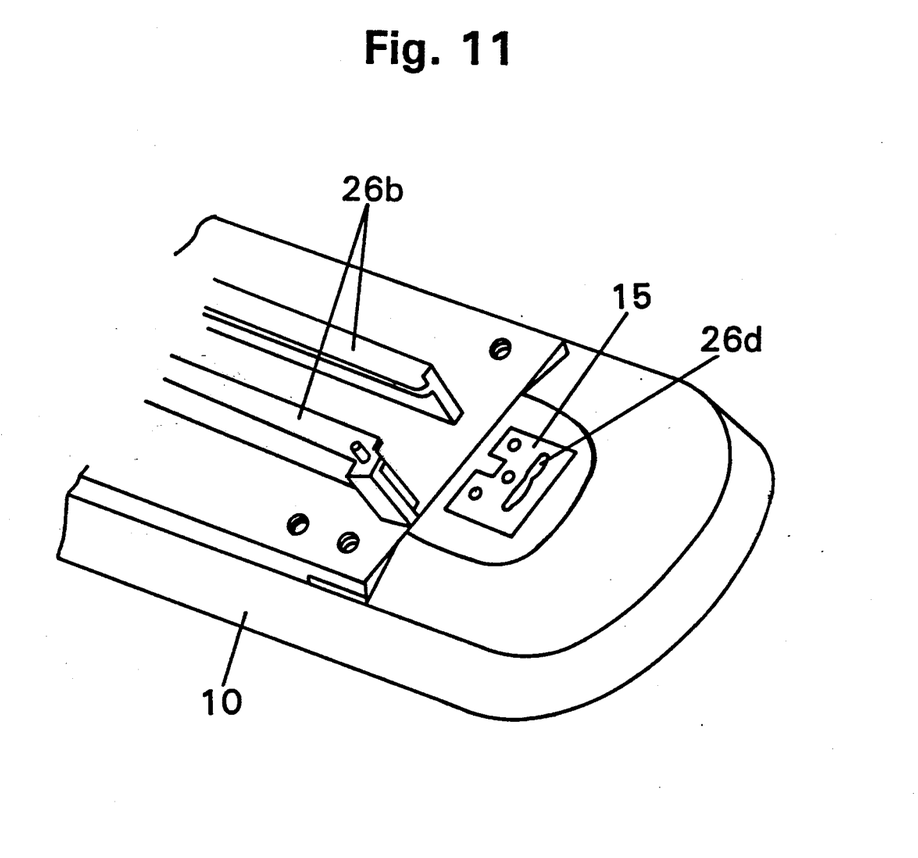
FIG. 11 is a view in perspective of the staple bending part of the case.

At the bottom of the striking block 8, the staple striking blade 23 is formed as an integral part of the striking block 8, and the guide rib 24 is set up facing this staple striking blade 23 with a small space left between them. As shown in FIG. 11, a pair of staple case insertion ribs 26b are set up on the case 10, also the staple bending plate 15 is embedded flush with the surface, and the staple bending groove 26d is provided in this staple bending plate 15. The staple case 25a is received by the staple case insertion ribs 26b, and the staple case head 25b is provided at one end of the staple case 25a. The staple case aperture 25c, driving the staples into the papers, is opened at the side of the staple case head 25b. A pair of staple case sidewalls 25d, each having two step portions, are set up on both sides of the staple case head 25b (FIG. 10).

Figure 7:
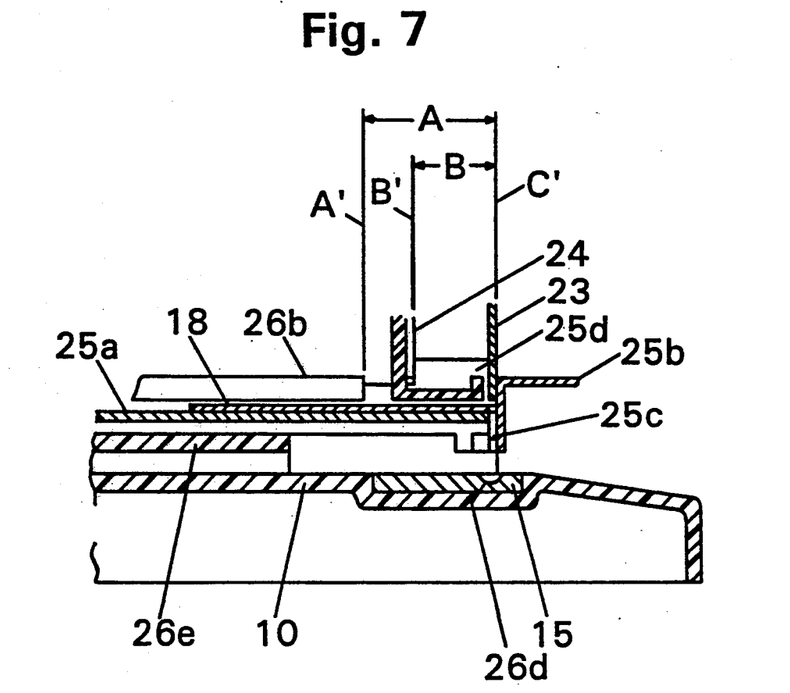
FIG. 7 is a cross-sectional view showing the principal parts of the staple striking blade, the rib, and the staple case and the case, which are attached to the main frame.
Figure 8:
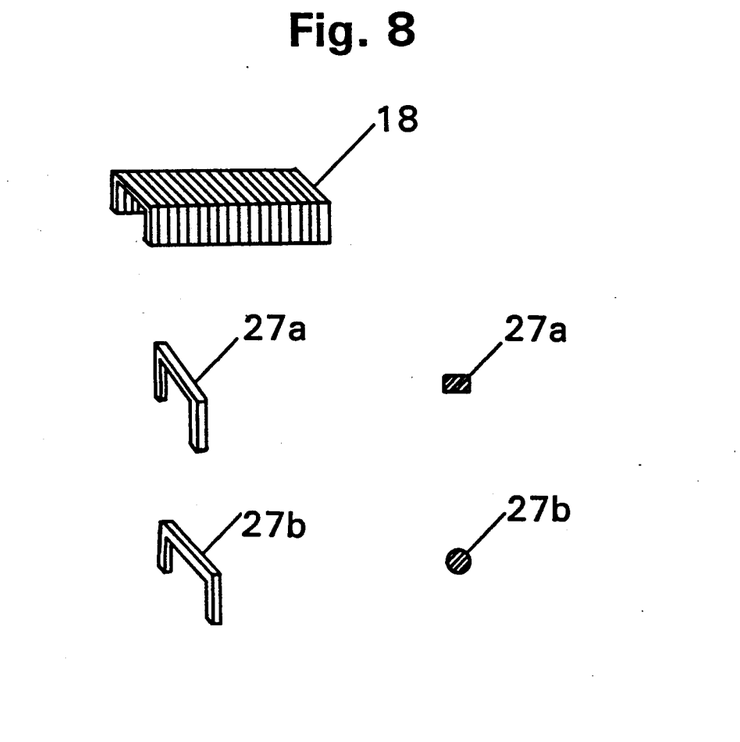
FIG. 8 is a view in perspective of various binding staples.
Figure 9:
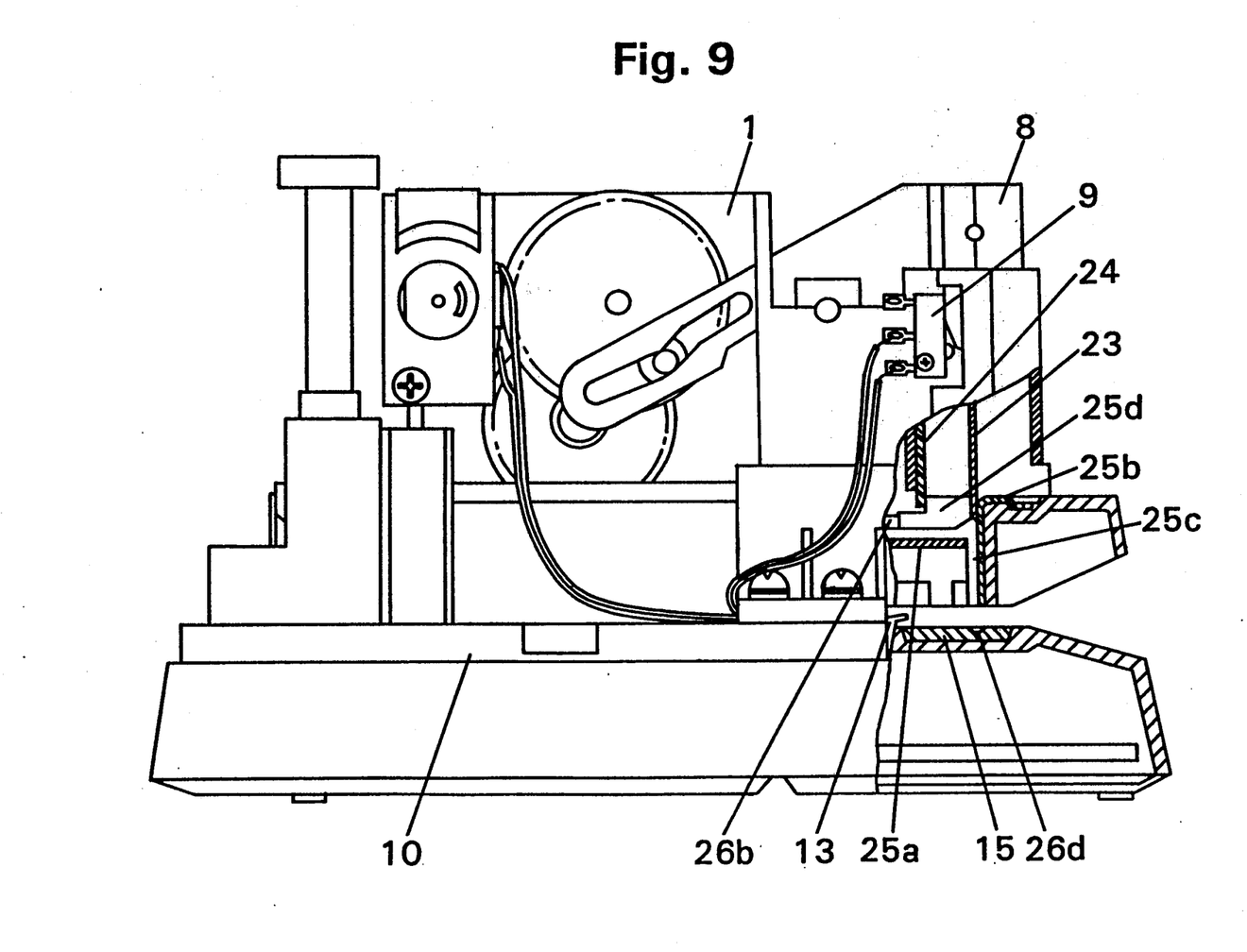
FIG. 9 is a side view showing a partial cross-section with the cover removed.

FIG. 7 is a cross-sectional view with staples 18 enclosed in the staple case 25a which in turn is set into the staple case insertion ribs 26b. FIG. 8 shows a view in perspective of connected staples 18, where 27a is a commonly used binding staple, and 27b is a binding staple which has a circular shaped cross-section. In FIG. 7, A' is the contact face at which one step portion of the staple case sidewalls 25d contacts with the end of the staple case insertion rib 26b, B' is the contact face at which another step portion of the staple case sidewall 25d contacts with the guide rib 24, and C' is the contact face at which the inner surface of the staple case head 25b contacts with the staple striking blade 23.

Here, the dimension "A" represents the distance from the right end surface of the staple case insertion rib 26b which is set up on the case 10, to the staple bending groove 26d provided on the staple bending plate 15 which is embedded flush with the surface of the case 10. This distance is set to be the same as the distance from one step portion of the staple case sidewalls 25d provided on the staple case 25a, to the staple case aperture 25c. In this example, because one step portion of the staple case sidewalls 25d is contacted with the staple case insertion rib 26b, when these are put together the positions of the staple case aperture 25c and the staple bending groove 26d coincide accurately. The dimension "B" is the distance from another step portion of the staple case sidewall 25d to the inside wall of the staple case head 25b, and this is set to be the same as the distance from the right sidewall of the guide rib 24 to the right sidewall of the staple striking blade 23. Therefore, it is possible for the staple striking blade 23 to descend accurately on the staple case aperture 25c.

Next, the operation will be explained. When the staple case head 25b is pulled to the right, the staple case 25a, which is drawn by the staple pushing spring provided in the case 10, is pulled out. After the staples 18 are loaded into this staple case 25a which was pulled out, the staple case 25a is pushed in, and the notch 25f of the hook 25e provided at the rear section of the staple case 25a (FIG. 10) is set in place at the rear section of the case 10. Next, when the papers to be bound are inserted between the staple case 25a and the case 10, switch 13 (FIG. 9) turns on, the staple striking blade 23 descends, the single forwardmost staple 18, of the staples which are in a connected state, is cut off and pierces the papers, and binding of the papers is performed by bending the ends of the staple 18 in the staple bending groove 26d. Further, the stapler in this example is also driven, for example, by the drive circuit in FIG. 12 in the same way as Example 1.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:
1. A stapler comprising:

a striking block having a staple striking blade for striking staples on its end and a rib formed on the striking block as an integral part of said striking block;

a coupling rod, at one end of which is attached the striking block, and at the midsection of which is attached a fulcrum shaft;

a driving means for allowing the coupling rod to reciprocate to cause reciprocating motion of the staple striking block over a range from a staple striking position to a stopping position apart from the staple;

a switching means that is provided adjacent to the striking block, and is turned on and off by said rib, based on the rise and fall of the striking block; and a control means which reverses the driving direction of the driving means, moves the striking block to the stopping position, and turns off the switching means, in case the switching means is not turned off within a predetermined time after the switching block is turned on by the motion of the striking block.

2. A stapler as claimed in claim 1, which further comprises:

a transmitting means which is connected to the other end of the coupling rod, and which transmits driving force from the driving means to the coupling rod;

a fulcrum bearing which supports the fulcrum shaft; and a single coil spring which forces the fulcrum shaft in the direction of the fulcrum bearing;

wherein the fulcrum shaft is able to move against the force of the coil spring in case a load is exerted on the fulcrum shaft by the striking operation of the striking block.

3. A stapler as claimed in claim 2, which further comprises a single main frame to which the driving means, the transmitting means, the coupling rod and the fulcrum shaft are attached.

4. A stapler as claimed in claim 1, wherein the rib has flexibilty.

5. A stapler comprising:

a striking block which has a staple striking blade for striking a staple;

a guide rib provided at a prescribed interval from the staple striking blade;

a staple case having a staple case head at one end, a staple case aperture provided near the staple case head, and a pair of staple case sidewalls each having two step portions; and a case having a pair of staple case insertion ribs which receive and guide the staple case;

wherein each of the staple case insertion ribs guide the staple case to a predetermined position and wherein the stapler case insertion ribs contact one step portion on each staple case sidewall, and when the striking blade strikes a staple, the striking position of the staple striking blade is prescribed by means of the guidance of the guiding rib by another step portion of each staple case sidewall.

6. A stapler as claimed in claim 5, wherein the staple striking blade has a concave shaped transverse section.

7. A stapler comprising:

a striking block having a staple striking blade for striking staples on its end and a rib formed on the striking block as an integral part of said striking block;

a coupling rod, at one end of which is attached the striking block, and at the midsection of which is attached a fulcrum shaft;

a direct current motor for allowing the coupling rod to reciprocate to cause a reciprocating motion of the staple striking blade over a range from a staple striking position to a stopping position apart from the staple;

a switching means that is provided adjacent to the striking block, and is turned on and off by said rib, based on the rise and fall of the striking block; and a control means which reverses the direction of rotation of the motor, moves the striking block to a position away from the staples, and turns off the switching means in case the switching means is not turned off within a predetermined time after the switching means is turned by the motion of the striking block.

8. A stapler as claimed in calim 7, wherein the control means stops the rotation of the motor in case the striking block does not return to the position where the switching means is turned off, even though the direction of rotation of the motor has been reversed.

* * * * *

UNITED STATES PATENT AND TRADEMARK OFFICE
CERTIFICATE OF CORRECTION

PATENT NO. : 5,195,671

DATED : March 23, 1993

INVENTOR(S) : Shigehiko Shimomura et al.

It is certified that error appears in the above-identified patent and that said Letters Patent is hereby corrected as shown below:

In the Claims:

At column 8, line 40, insert --on-- between the words "turned" and "by".

Signed and Sealed this

First Day of March, 1994

BRUCE LEHMAN

Attest:

Attesting Officer

Commissioner of Patents and Trademarks